United States Patent

[11] 3,550,781

| [72] | Inventor | George E. Barrow |
| | | 1609 Field Drive, Enid, Okla. 73701 |
| [21] | Appl. No. | 823,379 |
| [22] | Filed | May 9, 1969 |
| [45] | Patented | Dec. 29, 1970 |

[54] VAPORIZATION PLATE AND FLUID FILTER
5 Claims, 4 Drawing Figs.

[52] U.S. Cl..................................................... 210/180,
210/184
[51] Int. Cl...................................................... B01d 35/18
[50] Field of Search........................................ 210/180,
185, 184, 243, 498; 219/467, 463, 457

[56] References Cited
UNITED STATES PATENTS

| 1,705,702 | 3/1929 | Backer | 219/463X |
| 2,173,631 | 9/1939 | Niedens | 210/180X |
| 2,588,533 | 3/1952 | Johnson | 210/498X |
| 2,785,109 | 3/1957 | Schwalge | 210/180X |
| 2,839,196 | 6/1958 | Schwalge | 210/180 |
| 2,932,400 | 4/1960 | Scovuzzo | 210/448X |
| 3,043,944 | 7/1962 | Hanson | 219/463 |
| 3,116,400 | 12/1963 | McOrlly | 219/467 |

*Primary Examiner*—Samih N. Zaharna
*Attorney*—Dunlap, Laney, Hessin and Dougherty

ABSTRACT: The present invention has primary utility for continuously removing contaminants from a fluid stream, and in one embodiment comprises a closed vessel having a vapor outlet at the top thereof and a liquid inlet at the bottom. Within the closed vessel may be secured heating means, such as a plate containing an electrical resistance heater, which plate is positioned to form two chambers within the vessel. A plurality of apertures having nonuniform cross-sectional areas are formed in the plate with the portion of the apertures having the larger cross-sectional area opening into the upper chamber and the portion of the apertures having the relatively smaller cross-sectional area opening into the lower chamber of the vessel. Filter means may be provided in the lower chamber and an outlet, or overflow, may be provided through the wall of the vessel above the plate for removal of the purified liquids.

PATENTED DEC 29 1970
3,550,781
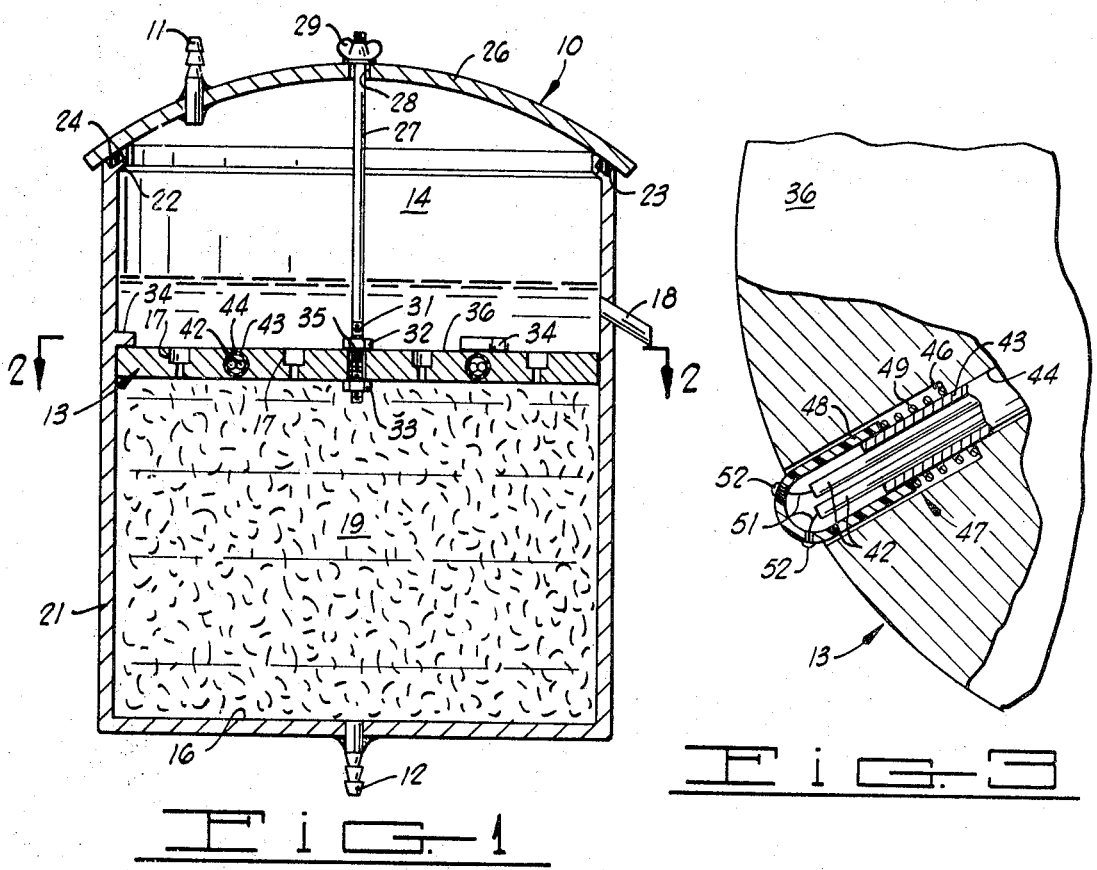
Fig. 1
Fig. 3
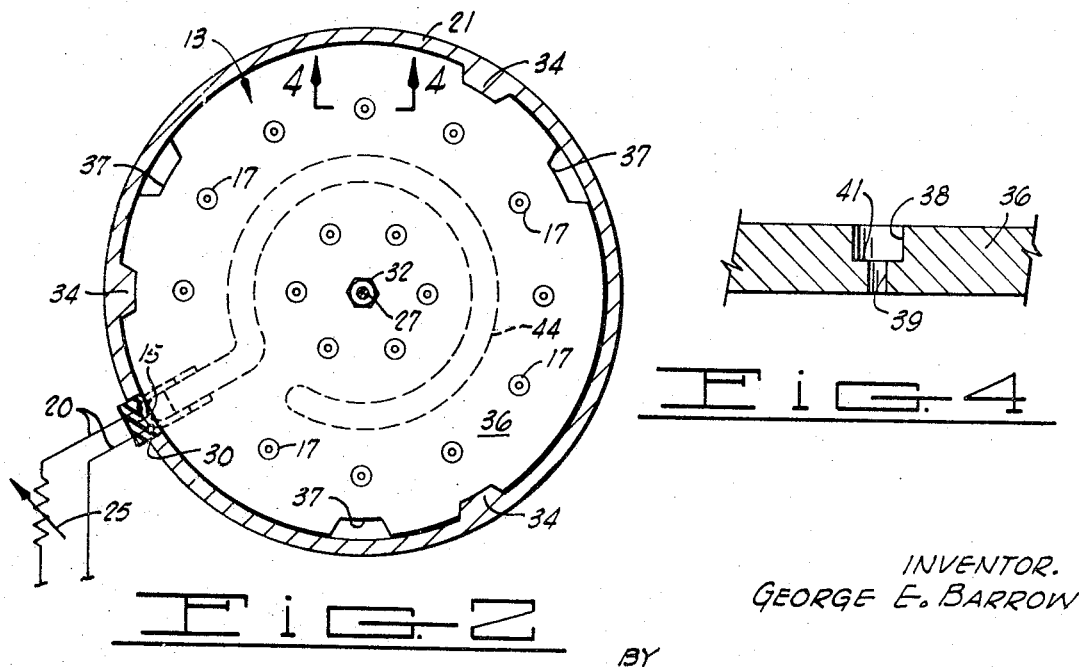
Fig. 2
Fig. 4
INVENTOR.
GEORGE E. BARROW
BY
Dunlap, Laney, Hessin & Dougherty
ATTORNEYS 3,550,781

VAPORIZATION PLATE AND FLUID FILTER

BACKGROUND OF THE INVENTION

One of the more common types of commercial and laboratory techniques for purifying liquids is bottomed on the fact that dissimilar liquids usually have different boiling points. Thus, by carefully controlling the heat applied to a mixture of the two liquids, it is possible to vaporize the liquid having the lower boiling point while leaving the other as a liquid. In spite of the fact that this basic technique is in general use in many types of industries and in many sophisticated chemical laboratories, it is unfortunately true that (a relatively insignificant number of moonshiners notwithstanding) simple, inexpensive, relatively foolproof apparatus for purifying by distillation is not available. This lack of availability is surprising since the basic mechanism for this type of purification is so well known and also since there are many nonindustrial and small industry applications for the process. For instance, it is not uncommon for small quantities of fuel oil to become contaminated with water either in the homeowner's storage facilities or in the storage and transportation facilities of the final distributor. Similarly, in certain restaurant and cooking operations the need exists for apparatus to purify cooking oils to remove the more volatile, odoriferous materials which become entrained within them and prevent their reuse or economical disposal.

The present invention was designed to fulfill the need of such nonindustrial and small industrial users for a simple, inexpensive mechanism for purifying contaminated fluids, such as the ones mentioned above.

DECRIPTION OF THE DRAWINGS

Apparatus embodying one form of the present invention is disclosed in the following description which is to be read in conjunction with the accompanying drawings wherein like reference characters designate like parts in all views and wherein:

FIG. 1 is a vertical, cross-sectional view of one form of apparatus embodying the present invention showing the relationship of a container with internal heating means;

FIG. 2 is a cross-sectional view taken along line 2-2 of FIG. 1 showing the location of apertures formed within the heating means as well as the location of an electrical resistance heater imbedded therein;

FIG. 3 is an enlarged, detailed view of a portion of the heating means shown in FIG. 2 wherein the details of an electrical contact assembly are disclosed; and FIG. 4 is a fragmentary, enlarged, cross-sectional view taken along line 4-4 of FIG. 2 showing the interior shape of an aperture formed within the heating means.

GENERAL DESCRIPTION OF THE APPARATUS

Turning now to the drawings and in particular to FIG. 1, the major structural components of one form of the present invention may there be seen to comprise a closed vessel indicated generally by the numeral 10 which has formed at the upper portion thereof a vapor outlet 11, with a fluid inlet 12 found near the bottom. Disposed within vessel 10 is heating means indicated generally by the numeral 13 which divides the interior of vessel 10 into an upper chamber 14 and a lower chamber 16. A plurality of apertures 17 are formed in heating means 13 to provide communication between upper chamber 14 and lower chamber 16 for a purpose to be hereinafter discussed. A fluid outlet 18 communicates with the interior of chamber 14 at a point adjacent heating means 13 and functions to remove purified liquids therefrom.

A quantity of filter material 19, such as lint, glass wool, cotton waste or the like, is contained within chamber 16 to enmesh solid impurities which are entrained in fluid passing therethrough.

DETAILED DESCRIPTION OF THE STRUCTURE OF VESSEL 10

Vessel 10 is of relatively simple structure and comprises a cup-shaped member 21 at the bottom of which fluid inlet 12 is located. The upper surface of the lip of cup-shaped member 21 is angled upwardly toward the center of vessel 10 and projects radially inward from the interior surface of the vessel as indicated by the numeral 22. A circular groove 23 is formed in the upper surface of projection 22 to secure an O-ring 24 which is contained therein.

A dome-shaped cover 26 seats on projection 22 so that O-ring 24 is compressed between the cover and the projection to form a fluid-tight seal. Vapor outlet 11 is carried by cover 26, while a support rod 27 projects through an aperture 28 formed in the cover and is held thereon by removable securing means such as butterfly nut 29. Although not shown in the drawings, suitable gasket material may be utilized between the butterfly nut and the top of cover 26 in order to prevent escape of vapors through aperture 28. The lower end of support rod 27 is threaded as indicated at 31 and has upper and lower retaining nuts 32 and 33 on either end of an aperture 35 in heating means 13 through which support rod 27 passes.

A plurality of inwardly, radially extending dogs 34 (FIG. 2) are carried by the inner surface of member 21 and function to retain heating means 13 against upward motion when butterfly nut 29 is tightened on the upper end of support rod 27.

Since heating means 13 is electrically heated, vessel 10 includes means for providing electric current to the heating means. Such means includes a retaining dimple 15 (FIG. 2) located subjacent the level of dogs 34 on the inner surface of an insulated plug 30 passing through the wall of member 21. Dimple 15 is sized to receive therein a contact portion of heating means 13 which will be described in more detail hereinafter. A pair of insulated electrical conductors 20 terminate on the innermost surface of dimple 15 and function to provide controlled electric current to heating means 13. A rheostat, indicated generally by the numeral 25, is provided in combination with one of the conductors 20 so that the intensity of current transmitted to heating means 13 may be controlled to adjust the level of heat within vessel 10.

DETAILED STRUCTURAL DESCRIPTION OF HEATING MEANS 13

As best shown in FIG. 2, heating means 13 includes a disc plate 36 which may be fabricated from any relatively rigid material having high heat transmissibility. Steel, aluminum, or any other material which will not provide corrosion problems may be suitable for this purpose. Cast aluminum has been found to be substantially ideal.

Along the outer periphery of disc plate 36 there are formed a plurality (in this case 3) of notches 37 which are sized slightly larger than dogs 34. These notches are positioned along the periphery of plate 36 so that they will correspond in position to the dogs 34 projecting outwardly from the interior of member 21 when plate 36 is properly oriented. By this arrangement it is possible, once the notches are properly oriented, to lower plate 36 downwardly past the dogs and thereafter rotate it so that the dogs and notches no longer index thereby locking plate 36 against upward motion.

Apertures 17, which are formed in plate 36, are nonuniform in cross section. As seen in FIG. 4 the portion 38 of the apertures which opens into chamber 14 has a relatively larger cross-sectional area than the portion 39 which opens into chamber 16. It has been found that by utilizing apertures having this cross-sectional configuration a more uniform distribution of fluids on the surface of heating means 13 may be obtained due to the decrease in upward velocity of the fluids as they pass the step portion 41 of the apertures formed between the portions 38 and 39. As the upward velocity thus decreases there is a greater tendency for the fluid to flow outwardly and thus come into a more intimate contact with the heated portion of plate 36.

Heat is transmitted to plate 36 from a looped electrical resistance heating wire 42 which may be formed of any one of several high resistance materials which are well known in the art. Commonly nicrome wire will be found to be most satisfactory. Wire loop 42 is encapsulated in cylindrical insulation 43 and imbedded within plate 36 in a substantially O-shaped tunnel 44, the outer end of which is enlarged to form a step 46, as shown most clearly in FIG. 3.

A contact assembly 47 is carried at the outer end of wire loop 42 for providing positive electric contact with the conductors 20 which terminate on the inner portion of dimple 15. Contact assembly 47 includes a blind nipple 48 formed of electrical insulating material and telescoped over the outer ends of wire loop 42. A compression spring 49 seats against the open end of blind nipple 48 and also against step 46 formed in tunnel 44 whereby the blind nipple is urged outwardly away from plate 36 toward and into dimple 15 when the plate is properly aligned. A lead wire 51-51 is secured at each of the ends of wire loop 42 and passes through the closed portion of nipple 48 where it terminates in an electrical contact 52-52.

OPERATION

In considering the operation of the apparatus described above, let it be assumed that the cover and heating means are removed from member 21 and that member 21 is empty. Initially, filter material 19 is placed within the lower portion of member 21, following which plate 36, to which support rod 27 is already secured, is oriented so that notches 37 index with dogs 34. With the plate thus oriented it is lowered past the dogs and rotated slightly so that the dogs and notches are no longer indexed, as shown in FIG. 2. Thereupon cover 26 is placed in position as shown in FIG. 1 and butterfly nut 29 is secured to the top of support rod 27 and tightened so that the upper surface of plate 36 is brought into tight contact with the lower surface of dogs 34.

With the apparatus thus assembled a source of contaminated fluid can be placed in communication with the interior of member 21 through fluid inlet 12. This contaminated fluid can be one of many types. Commonly this apparatus will be found useful for removing water from fuel oil, and for purposes of explanation of its operation we may restrict our discussion to this particular mixture. Moreover, let it be assumed that the water contaminated fuel oil contains solids, such as sludge and the like.

Prior to introduction of the fluid to the unit, rheostat 25 is adjusted so that plate 36 is heated to a temperature above the boiling point of the water contaminant and below the boiling point of the fuel oil. When thermal equilibrium is reached the contaminated fuel oil is introduced into chamber 16 through inlet 12 whereupon it passes through filter material 19 in which sludge and other solids become enmeshed. The water-fuel oil mixture emerges from the filter material and passes upwardly through apertures 17 onto the upper surface of plate 36. As it spreads out on the upper surface of the plate it is quickly heated to the temperature of the plate whereupon the water is vaporized and passes upwardly out through vapor outlet 11. The now purified fuel oil is removed from the vessel through fluid outlet 18.

From the above description it will be seen that the present invention provides means for conveniently and easily purifying liquids which contain contaminants boiling at a different temperature than do the liquids themselves. It will, of course, be understood that the embodiment described herein is presented by way of example only and that many changes and modifications thereto can be made without departing from the spirit of the invention and the scope of the annexed claims.

I Claim:
1. A fluid recovery apparatus comprising:
 a. a closed vessel;
 b. a metallic plate disposed within said vessel and extending transversely between the sidewalls thereof to divide said vessel into a lower chamber and an upper chamber, said plate having a plurality of apertures formed therethrough of nonuniform cross-sectional area, each of said apertures having a relatively small diameter lower portion opening into said lower chamber below said plate, and a relatively large diameter upper portion communicating with the small diameter lower portion of the aperture and opening into said upper chamber above said plate within said closed vessel;
 a looped electrical resistance heating element extending in at least one convolution within said plate for heating the plate, said heating element extending between and adjacent said apertures;
 means cooperating with said plate to retain said plate against upward and downward movement within said vessel;
 a contact assembly for furnishing current to said electrical resistance element, said contact assembly including means for connecting a source of electrical energy through a wall of said closed vessel to said electrical heating element;
 a quantity of filter material situated in said lower chamber below said plate;
 a vapor outlet communicating with the interior of said upper chamber for conveying vapor therefrom; and
 a fluid inlet communicating with the interior of said lower chamber on the opposite side of said filter material from said plate.

2. Apparatus as defined in claim 1 wherein said means for connecting a source of electrical energy to said electrical heating element includes:
 a blind nipple of electrical insulation material telescoped over one end of the looped electrical resistance heating element;
 lead wires passing through the closed end of the blind nipple and attached to the looped heating element; and
 resilient means seated between a portion of said plate and the open end of said blind nipple for pressing the end of the lead wires carried by the nipple into engagement with the source of electrical energy.

3. The apparatus defined in claim 1 and further characterized to include a fluid overflow outlet communicating with the interior of said upper chamber adjacent said plate.

4. Apparatus as defined in claim 1 where in the means in the interior of the chamber for retaining the plate against upward and downward movement in the chamber comprises a plurality of radially inwardly projecting dogs secured to the interior surface of the container at points near the central portion thereof; and wherein the outer periphery of said plate has formed therein a plurality of notches which are spaced in size to allow clearance between the plate and the dogs when the plate is moved in the interior of the container.

5. Apparatus as defined in claim 1 and further characterized to include:
 a support rod mounted at the central portion of the plate and projecting upwardly therefrom through an aperture formed in one end of the closed vessel; and
 removable securing means carried by the end of said support rod which projects outwardly from that end of the closed vessel through which said support rod extends.